US012020689B2

(12) United States Patent
Sundararajan et al.

(10) Patent No.: US 12,020,689 B2
(45) Date of Patent: Jun. 25, 2024

(54) METHOD TO IMPROVE DIGITAL AGENT CONVERSATIONS

(71) Applicant: International Business Machines Corporation, Armonk, NY (US)

(72) Inventors: Mukundan Sundararajan, Bangalore (IN); Jignesh K Karia, Thane (IN); Sandipan Sarkar, Kolkata (IN); Deepa Dubey, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 17/718,357

(22) Filed: Apr. 12, 2022

(65) Prior Publication Data
US 2023/0326451 A1 Oct. 12, 2023

(51) Int. Cl.
*G10L 15/22* (2006.01)
*G10L 15/06* (2013.01)
*G10L 15/28* (2013.01)
*G10L 15/30* (2013.01)

(52) U.S. Cl.
CPC .......... *G10L 15/063* (2013.01); *G10L 15/22* (2013.01); *G10L 15/285* (2013.01); *G10L 15/30* (2013.01); *G10L 2015/0633* (2013.01)

(58) Field of Classification Search
CPC ..... G10L 15/063; G10L 15/22; G10L 15/285; G10L 15/30; G10L 2015/0633; G06N 3/006; H04L 51/02; G06F 40/35
See application file for complete search history.

(56) References Cited

U.S. PATENT DOCUMENTS

| 8,271,600 | B2 | 9/2012 | Herold |
| 10,671,448 | B2 | 6/2020 | Wood |
| 10,789,040 | B1 | 9/2020 | Silvester |
| 11,120,226 | B1* | 9/2021 | Nudd ................. G06F 40/30 |
| 11,948,563 | B1* | 4/2024 | Liu .................... G10L 15/08 |

(Continued)

OTHER PUBLICATIONS

"Two Artificial Intelligence (AI) Chatbots talk and argue with each other", Youtube, downloaded from the Internet on Dec. 21, 2021, 6 pages, <https://gist.github.com/jsejcksn/a48c82deb85812305655ae70f6085fdc>.

(Continued)

*Primary Examiner* — Abul K Azad
(74) *Attorney, Agent, or Firm* — David K. Mattheis (57) ABSTRACT

A computer-implemented method for virtual agent conversation training is disclosed. The computer-implemented method includes determining a current state of a first stage of a conversation between a pair of virtual agents. The computer-implemented method further includes determining a pivot distance between the current state of the first stage of the conversation and a subsequent, second stage of the conversation. The computer-implemented method further includes responsive to determining that the pivot distance between the current state of the first stage of the conversation and the subsequent, second stage of the conversation is below a predetermined threshold, determining an angle of dislocation with respect to the pivot distance. The computer-implemented method further includes terminating the conversation based, at least in part, on determining that the angle of dislocation is above a predetermined threshold.

20 Claims, 6 Drawing Sheets

(56) References Cited

U.S. PATENT DOCUMENTS

2015/0186156 A1    7/2015   Brown
2016/0182435 A1*   6/2016   Landqvist ............... H04L 51/52
                                                            709/204
2019/0068527 A1*   2/2019   Chen ..................... G06F 40/216

OTHER PUBLICATIONS

Mell et al., "The NIST Definition of Cloud Computing", Recommendations of the National Institute of Standards and Technology, Special Publication 800-145, Sep. 2011, 7 pages.
Voss, Peter, "Beyond Chatbots: Hyper-Personalized, Intelligent Assistants", Feb. 25, 2019, 5 pages, <https://www.forbes.com/sites/cognitiveworld/2019/02/25/beyond-chatbots-hyper-personalized-intelligent-assistants/?sh=c9938f82aba7>.

* cited by examiner

DETERMINING THE PIVOT POINT:

| SET # | CONTEXT | STATE | PIVOT DISTANCE / ANGLE OF DISLOCATION | RESPONSE TRIAD FROM SET FOR NLG | ADDITIONAL ITEMS | SENTIMENT | TRAINING CANDIDATE |
|---|---|---|---|---|---|---|---|
| 1 | - | S2 | 0.75 | REFERENCE, RESCHEDULE, DOCTOR'S APPOINTMENT | LAB VISIT | | |
| 2 | DOCTOR'S APPOINTMENT | S2 | 0.09 | TIME SLOT, COME BACK | | | YES |
| 3 | DOCTOR'S APPOINTMENT, LAB RESERVATION | S1 | 0.5 | - | ANYTHING ELSE, HELP | | |
| 4 | APPOINTMENT | S1 | 0.4 | DATES, LAB, DOCTOR BOOKING, AVAILABLE | | | YES |
| 5 | 24TH APPOINTMENT | - | 0.25 | - | | APPRECIATION | |
| 6 | APPOINTMENT | S1 | 0 | BOOK, CANCEL | | | YES |
| 7 | APPOINTMENT | S1, S3 | 0.2 | WEEKEND SLOT, LOOK | LAB | | YES |
| 8 | APPOINTMENT DATES | - | 0.25 | VISITS, MAKE | LAB, BUSY PERIOD, | NOT GOOD | |
| 9 | LAB SLOTS | S1 | 0 | HAVE BOOKINGS | APPOINTMENT DATES | | YES |
| 10 | LAB | S1 | 0 | MAKE BOOKING | SCHEDULE DATES | | YES |
| 11 | APPOINTMENT, LAB | S1, S3 | 0 | CONFIRM BOOKING, CANCEL | | | YES |
| 12 | CAFETERIA | S1, S3 | 0 | CAFETERIA, VISIT | | RECEPTION | YES |
| 13 | CONCLUSION | S1, S3 | 0 | | | APPRECIATION | YES |

METHOD TO IMPROVE DIGITAL AGENT CONVERSATIONS

BACKGROUND

The present invention relates generally to the field of conversational agents, and more particularly to, training conversational agents through conversations between multiple conversational agents.

Conversational agents and virtual assistants are software applications that are designed to simulate human text or verbal conversations. A conversational agent can engage in conversations with a human user or another conversational agent. A conversational agent interprets and responds to statements received in ordinary language by integrating computational linguistics techniques with communication over the internet.

SUMMARY

According to one embodiment of the present invention, a computer-implemented method for virtual agent conversation training is disclosed. The computer-implemented method includes determining a current state of a first stage of a conversation between a pair of virtual agents. The computer-implemented method further includes determining a pivot distance between the current state of the first stage of the conversation and a subsequent, second stage of the conversation. The computer-implemented method further includes responsive to determining that the pivot distance between the current state of the first stage of the conversation and the subsequent, second stage of the conversation is below a predetermined threshold, determining an angle of dislocation with respect to the pivot distance. The computer-implemented method further includes terminating the conversation based, at least in part, on determining that the angle of dislocation is above a predetermined threshold.

According to another embodiment of the present invention, a computer program product for virtual agent conversation training is disclosed. The computer program product includes one or more computer readable storage media and program instructions stored on the one or more computer readable storage media. The program instructions include instructions to determine a current state of a first stage of a conversation between a pair of virtual agents. The program instructions further include instructions to determine a pivot distance between the current state of the first stage of the conversation and a subsequent, second stage of the conversation. The program instructions further include instructions to responsive to determining that the pivot distance between the current state of the first stage of the conversation and the subsequent, second stage of the conversation is below a predetermined threshold, determine an angle of dislocation with respect to the pivot distance. The program instructions further include instructions to terminate the conversation based, at least in part, on determining that the angle of dislocation is above a predetermined threshold.

According to another embodiment of the present invention, a computer system for virtual agent conversation training is disclosed. The computer system includes one or more computer processors, one or more computer readable storage media, and computer program instructions, the computer program instructions being stored on the one or more computer readable storage media for execution by the one or more computer processors. The program instructions include instructions to determine a current state of a first stage of a conversation between a pair of virtual agents. The program instructions further include instructions to determine a pivot distance between the current state of the first stage of the conversation and a subsequent, second stage of the conversation. The program instructions further include instructions to responsive to determining that the pivot distance between the current state of the first stage of the conversation and the subsequent, second stage of the conversation is below a predetermined threshold, determine an angle of dislocation with respect to the pivot distance. The program instructions further include instructions to terminate the conversation based, at least in part, on determining that the angle of dislocation is above a predetermined threshold.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of conversational agents, and more particularly to, training conversational agents through conversations between multiple conversational agents.

A key application area of Artificial Intelligence (AI) has been AI based Digital Assistants (also known as Virtual Assistants). The use of digital media and digital assistants in businesses and personal life are expanding rapidly. In some cases, two digital assistants may even interact, in which one or both digital assistants take the place of a human. For example, this could occur in the course of a transaction in an intelligent workflow where digital assistants between two business functions or business entities need to interact. Given the variety of issues that can arise due to either different standards or different processes and definitions, these agents need to resort to having simulated conversations between themselves to identify and resolve any inconsistencies or issues.

Typically, AI conversations are between a human and a digital assistant. With a human on one side of the conversation, the possibility of the conversation going off topic are becoming out of context is limited as a human can provide an appropriate response or rephrase a question or answer if the digital assistant provides an inappropriate response due to a misunderstanding of the context of the conversation. If the digital agent is able to be steered in the right direction, the conversation continues until a mutual stopping point or end result is achieved. However, if the digital agent is unable to be directed to the right conversation context, ethe conversation is transferred to another human agent in order to reach a logical closure to the conversation.

AI based virtual assistant chatbots exist to handle conversations for a task and could be driven using a rule base or a dialog manager. On the other end, an organization's chat bot agent can provide information and complete tasks in a workflow such as making/changing bookings, ordering appropriate materials required, etc. come across new terms, and in an omni-channel world, can move the conversations to human agents or terminate abruptly. Typically to test the digital conversation areas, the context is established, and the phrases or sentences are checked for reference to the contexts to detect turns in the conversation.

The challenges with the existing solutions are that the named entity recognition (NER) definitions and their references are not available except through either a Bag of Words (BoW) approach or a reference table. Such a reference would be available with one of the participants, and not with both. Sharing of the database is not allowed due to confidentiality reasons and use of public information can be an approach for the user end digital agent, but not necessarily correct. Other disadvantages include the conversation partner robot getting stuck repeating the same phrase or ending the conversation abruptly, ultimately leaving a support ticket in an open state or abandoned and the customer dissatisfied. Another disadvantage is that the natural language generation used to continue the conversation is often not only ill-equipped to handle colloquial language, including slang, along with abbreviations, contractions, idioms, turns-of-phrase, and other informal words, phrases, and jargon, but also ill-equipped to detect or understand contextual changes in the conversation (also known as conversation turns). This stems from the fact that colloquial language and conversation turns are not a defined objective method but are based primarily on stochastic computations that are not robust enough.

While existing solutions of conversations between digital agents leading to successful closure of a stated issue exist with direct statements or with conversation turns, there is a need for a system and method to enable a business end digital agent to be up to date with cross references, new products being introduced and conversation twists from the customer digital agent that lead to different end states from which the business end digital agent needs to be move beyond the pivot point of a conversation. Embodiments of the present invention resolve these issues by reducing the number of abandoned conversations, hung conversations and extended conversation times between the digital agents leading to a nil-value end state. Embodiments of the present invention revolves around how the digital agent at the business end establishes the context, the issue brought out and even with context changes or references by the other digital agent or sentences that do not have a relationship to the context or issue. Embodiments of the present invention are able to pivot the conversation to the context and in most cases leading to a stable end state defined by an action of either providing more information or a successful resolution of the contextual issue.

As an example, consider a scenario of an AI conversation between two Digital Assistants. In such a case, depending upon how the Digital Agents are trained, the context of interaction may totally change, especially when the understanding of particular keywords or utterances differs between digital assistants. For example, suppose a digital assistant is trained for a banking related conversation. For such assistant, the word "Balance" will signify the amount in the account of a customer. However, for the other Digital Agent, the same word "Balance" may also mean "an even distribution of weight enabling someone or something to remain upright and steady." Another example could be where the word "Red" may signify the color Red, however for another Digital Assistant, it may refer to a popular Telecom plan offered by a Telecom Service Provider. Embodiments of the present invention focus on solving the problem of semantic variations among different Digital Agents to ensure that the interaction between two Digital Agents or a Digital Agent and human pair remains within context.

Embodiments of the present invention define pivoting of a conversation between two digital agents to a context. The pivoting of a conversation to a context is determined by the context reference being directly in the sentence or if the words in the sentence can be referenced back to the existing context by the angle of variation between each word to the context. Embodiments of the present invention determine the pivot distance after each conversation stage. Pivot distance is computed by the word presence in the Bag of Phrases (BoP) and BoW and the distance of the sentence to the context. Embodiments of the present invention define the end states for conversations between digital agents. After a pair of utterances by the digital agents (dialog step), the sentences are analyzed to determine the end state. A conversation will have one or more such dialog steps and change of context in a dialog step marks the end of conversation stage. Within a conversation stage end states change after each dialog step. End states for a digital agents' conversation are determined by the organization and specified as how and when conversations should end.

Embodiments of the present invention further summarize the conversation in terms of the conversation stages and pivot distances between conversation stages. This is a representation of the conversation without holding the entire conversation log but showing through distances of each sentence with the action and measuring the deviation to the established context reference. Embodiments of the present invention additionally determine when the conversation is moving beyond the boundaries leading to new states, as well as when the conversation remains stuck, and thus whether human intervention is required.

Embodiments of the present invention further use natural language generation (NLG) which is based on triad and conversation thread till the point to add the relevant words to create the new sentence. In an embodiment, a triad is the smallest unit of a language grammar that is composed of subject, object, and verb. Embodiments of the present invention analyze words in the conversation stage or thread to determine subject, object contexts, action, and end states. Embodiments of the present invention auto generate test cases and boundaries for conversations based on pivoting distance. Embodiments of the present invention improve a BoP/BoW approach based on utilizing pivoting distance in order to determine the relevance of a sentence to the context or if it is a sentiment based sentence, then adding the words to BoP/BoW to generate additional conversation test cases and auto-verifying if the original agent is able to respond correctly to the new conversation thread. Embodiments of the present invention reduce the number of abandoned conversations, hung conversations and extended conversation times between the digital agents leading to a nil-value end state.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
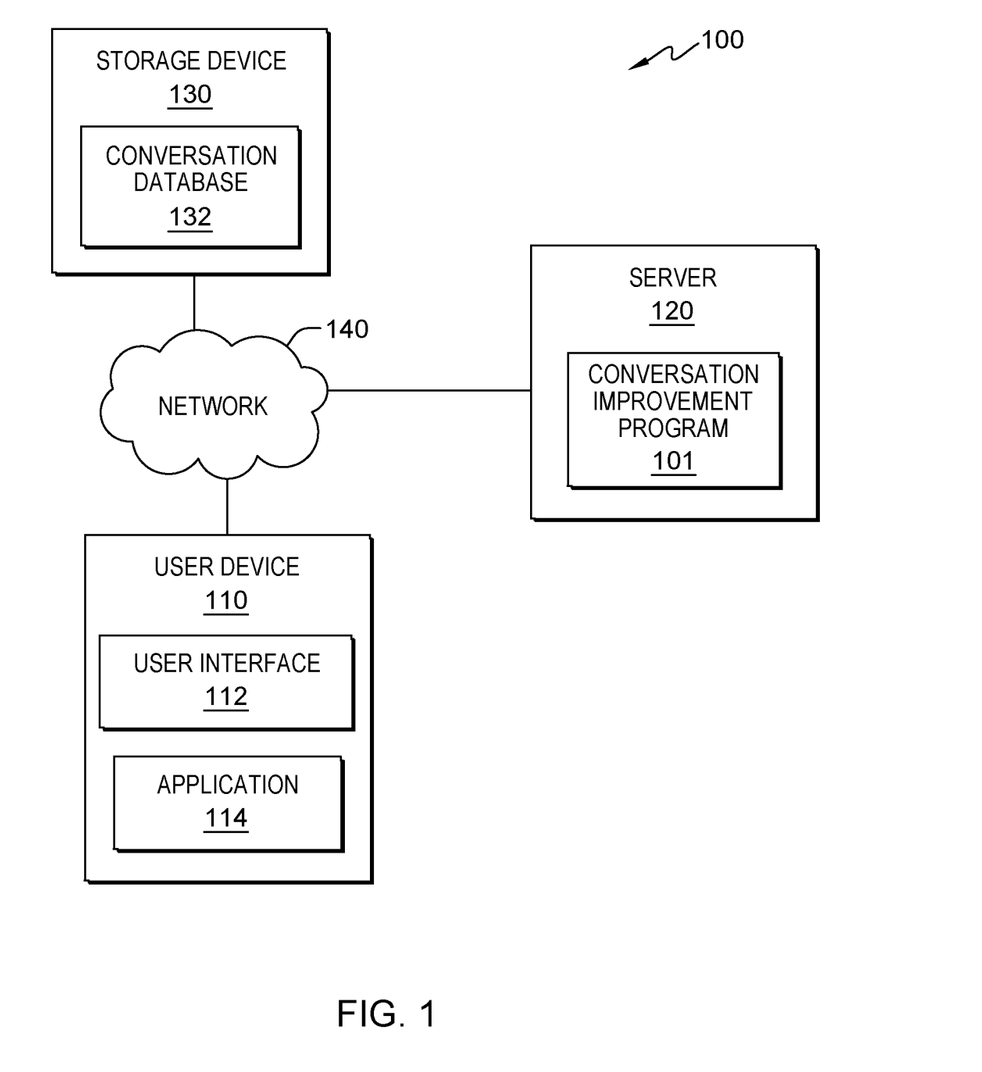
FIG. 1 is a block diagram of a network computing environment suitable for conversation improvement program 101, generally designated 100, in accordance with at least one embodiment of the present invention.

The present invention will now be described in detail with reference to the Figures. FIG. 1 is a functional block diagram of a network computing environment suitable for conversation improvement program 101, generally designated 100, in accordance with at least one embodiment of the present invention. In an embodiment, network computing environment 100 may be provided by cloud computing environment 50, as depicted and described with reference to FIG. 5, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 4.

User device 110 further includes user interface 112 and application 114. User interface 112 is a program that provides an interface between a user of an end user device, such as user device 110, and one or more applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on user device 110. In an embodiment, application 114 is representative of one or more applications (e.g., digital agent applications, chat box applications, etc.) located on user device 110. In various example embodiments, application 114 can be an application that a user of user device 110 utilizes to interact with, converse with, or otherwise exchange information with a digital assistant. In an embodiment, application 114 can be a client-side application associated with a server-side application running on server 120 (e.g., a client-side application associated with conversation improvement program 101). In an embodiment, application 114 can operate to perform processing steps of conversation improvement program 101 (i.e., application 114 can be representative of conversation improvement program 101 operating on user device 110).

Server 120 is configured to provide resources to various computing devices, such as user device 110. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g., database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

Server 120 includes conversation improvement program 101. In an embodiment, conversation improvement program 101 may be configured to access various data sources, such as the conversation histories from conversation database 132 that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, conversation improvement program 101 enables the authorized and secure processing of personal data. In an embodiment, conversation improvement program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, conversation improvement program 101 provides information regarding personal data and the nature (e.g., type, scope, purpose, duration, etc.) of the processing. In an embodiment, conversation improvement program 101 provides a user with copies of stored personal data. In an embodiment, conversation improvement program 101 allows for the correction or completion of incorrect or incomplete personal data. In an embodiment, conversation improvement program 101 allows for the immediate deletion of personal data.

Figure 4:
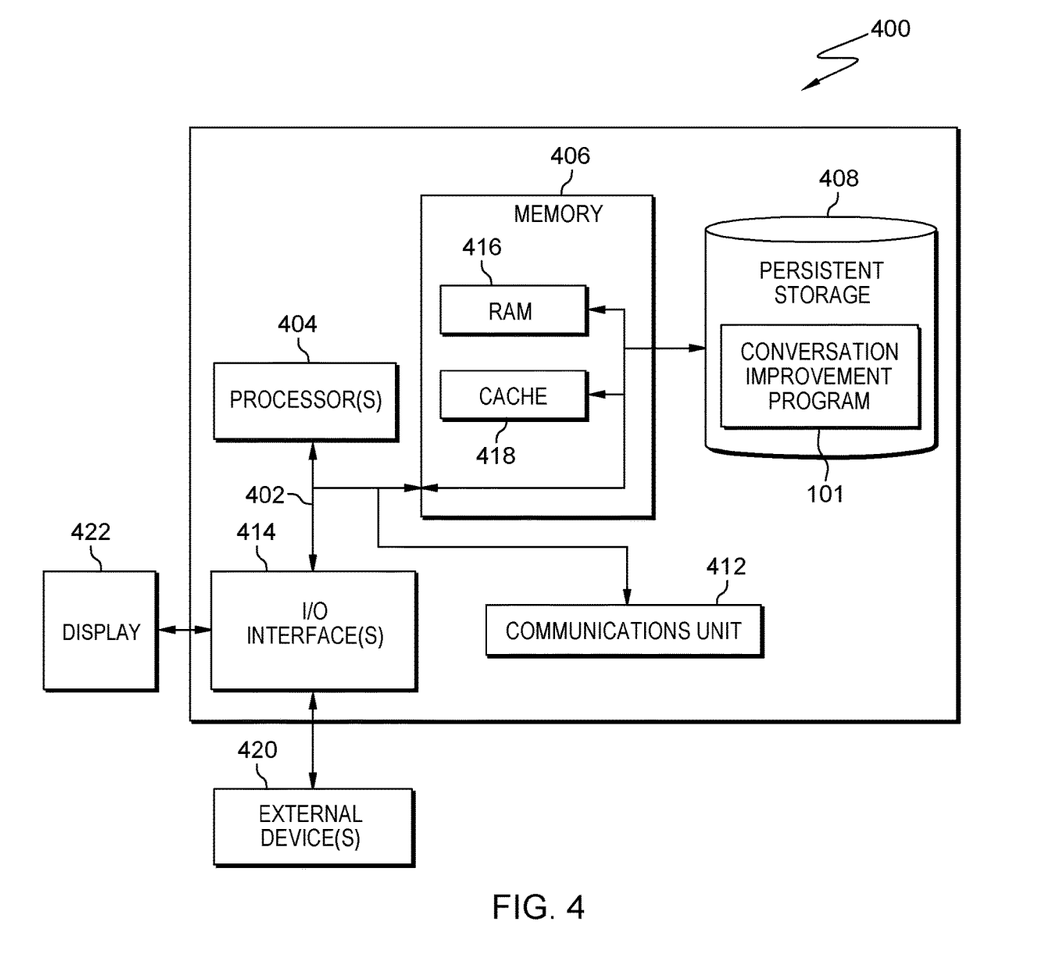
FIG. 4 is a block diagram depicting components of a computer, generally designated 400, suitable for executing a for conversation improvement program 101 in accordance with at least one embodiment of the present invention.
Figure 5:
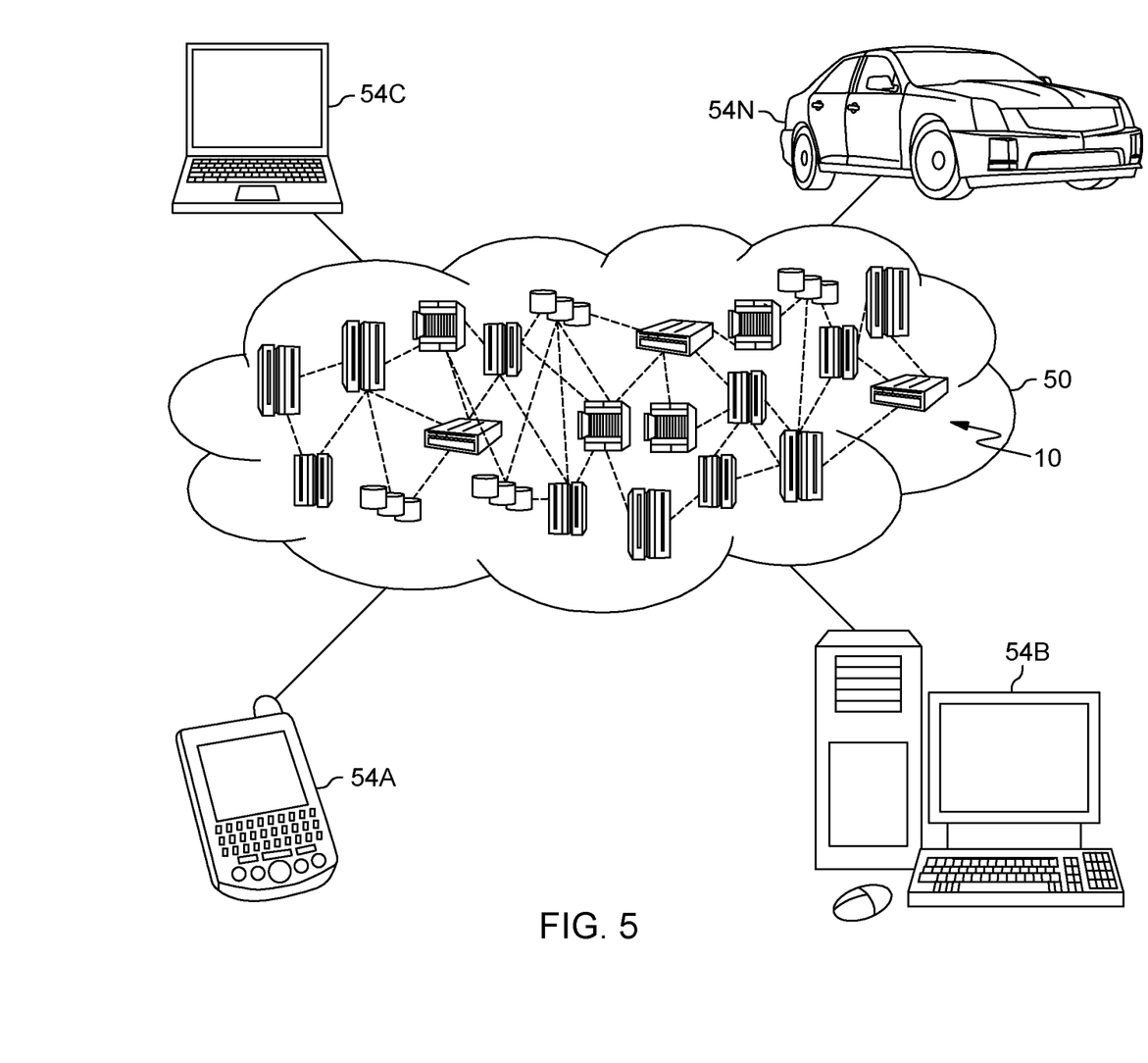
FIG. 5 is a block diagram depicting a cloud computing environment 50 in accordance with at least one embodiment of the present invention.

Server 120 may include components as depicted and described in detail with respect to cloud computing node 10, as described in reference to FIG. 5, in accordance with at least one embodiment of the present invention. Server 120 may include components, as depicted and described in detail with respect to computing device 400 of FIG. 4, in accordance with at least one embodiment of the present invention.

In various embodiments, storage device 130 is a secure data repository for persistently storing conversation information utilized by various applications and user devices of a user, such as conversation improvement program 101 and user device 110. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

Storage device 130 includes conversation database 132. In an embodiment, conversation database 132 includes one or more sets of BoW or BoP. In an embodiment, a set of BoW or BoP includes a list of words and phrases, respectively, for a particular conversational context. In an embodiment, BoW and BoP includes known words or phrases and their respective definitions. In an embodiment, conversation database 132 further includes synonyms and definitions of synonyms associated with words included in a BoW. In an embodiment, conversation database 132 includes conversation patches and predetermined pivotal distance thresholds for conversation patches. In an embodiment, a conversation patch is one or more sentences. For example, a conversation patch is a whole set of sentences. In another example, a conversation patch is one received line of text or message from a chat. In an embodiment, a conversation patch is a word or sentence fragment. In an embodiment, conversation database 132 includes information associated with historical conversations and the particular set of words of phrases allocated for these historical conversations between digital agents or human users.

In an embodiment, conversation improvement program 101 trains digital agents for particular conversational contexts based on analyzing one or more conversations. In an embodiment, the conversation comprises one or more sets, statements, or inputs from one or more conversation or digital agents. In an embodiment, conversation improvement program 101 generates one or more sets from the one or more sentences or phrases from the conversation.

In an embodiment, conversation improvement program 101 selects a particular conversational context for a conversation between two digital agents. In an embodiment, conversation improvement program 101 selects one or more conversation patches. In an embodiment, a patch is a set of statements by one of the conversational agents or a whole set for use by a digital agent for a particular conversational context. In an embodiment, a patch comprises the end states and intermediate state definitions for conversation improvement program 101. While standard states will be taken up, based on the conversation patches provided, such as from conversation database 132, new states can also be found. In an embodiment, conversation improvement program 101 analyses the currently used conversation patches and determines new states based on the conversation turns or terminations. In an embodiment, conversation improvement program 101 determines the uniqueness or frequency of the conversation patches to identify and cut down the states to valid ones. In an embodiment, the uniqueness is the pivotal distance, measurement of flows, and turns of an open or closed ended conversation.

In an embodiment, conversation improvement program 101 measures the flow, turns, and pivot distances from each conversation patch. For example, conversation improvement program 101 identifies from a conversation between two digital agents that one digital agent asked a question to the other digital agent. There may be several sentences in response and the context of the response (in terms of related product). The conversational agent may recognize an issue with the response by and rephrases the question to the digital agent. If the digital agent is able to respond and clarify or elaborate to the rephrased question, the conversation is allowed to continue. However, if the conversation remains stuck on the question (i.e., the question remains unanswered even after rephrasing), then human intervention is required to answer the digital agents question and the conversation between the two digital agents ends. In an embodiment, conversation improvement program 101 determines a pivot distance of a conversation. The pivot distance is calculated both at each dialog level and at the state level. In an embodiment, after a pair of utterances by the digital agents (dialog step), the sentences are analyzed to determine the end state. In embodiments, a conversation will have one or more such dialog steps and change of context in a dialog step marks the end of the conversation stage. In an embodiment, within a conversation stage an end state changes after each dialog step.

If the pivot radius is nearly a constant across dialogs and the state change does not occur, conversation improvement program 101 moves the conversation between two digital agents to a conclusion state and to the conversation end state. If the pivot radius of the dialogs varies, then additional new information is being obtained and conversation improvement program 101 allows the conversation thread to continue. It could then move into other intermediate states where the pivot radius remains constant or shrinks to zero to complete the conversation. The assessment of the conversation is made to {successful, abandoned, hung, nil-value}. In an embodiment, a successful conversation is a conversation in which two digital agents are able to successfully bring a conversation to an ending with a particular BoW or BoP allocated to the digital agents for a particular conversational context. In an embodiment, a hung conversation is a conversation that is looping or repeating and requires further assistance in answering the question posed in the conversation. If this occurs, conversation improvement program 101 may provide the digital agents with the most recent conversation patches or additional words or phrases. In an embodiment, a hung conversation has a constant pivotal distance and pivotal radius. If this occurs, conversation improvement program 101 may end the conversation and request human intervention to successfully bring the conversation to a close.

In an embodiment, conversation improvement program 101 receives the latest conversation patches from a help desk or database for abandoned, hung or nil-value cases. In an embodiment, conversation improvement program 101 updates and adds to the lexicon of the BoW in conversation database 132. In an embodiment, conversation improvement program 101 analyzes the conversation patches or dialogs that were in these end states to determine if new terms or phrases caused the end state and the contexts and to add them to the lexicon used.

In an embodiment, conversation improvement program 101 determines the pivot dislocation or extended distances. If the pivot radius does not increase to the next state or decrease to move to an end or shows a dislocation—radius and angle of a dialog compared to the previous dialog, conversation improvement program 101 determines if the next intermediate or final state is correct by computing the dislocation factor. If that factor sits on the slope lines to other states, then by extending the dialog, it can be moved across (initiating the sentence in a new dialog of a conclusion for a state and moving over to the next appropriate state). If the sentiment of the off-pivot conversation is positive or neutral, the conclusion path is taken but if it is negative, focus is brought back to the issue to be resolved with alternate state changes tried. Each state is represented by a factor of the goal of the virtual agent conversation.

In an embodiment, conversation improvement program 101 determines the pivot distance and angle of dislocation as follows:

Pivot distance: $D=\Sigma\{word:=BoP+BoW, 1,0\}/n+\Sigma\{word:synonymn:=BoP+BoW, x,y\}$, wherein x is the lower control unit and y is the upper control unit. In a graph, the x axis defines the conversation stages, and the y axis defines the distance in the conversation stage from the context reference.

Pivot distance<0.5 or angle of dislocation>45 deg
(tan theta>1)

In an embodiment, conversation improvement program 101 stops the conversation if the pivotal distance between two or more conversation patches are static. Meaning, the conversation is not progressing. In an embodiment, conversation improvement program 101 stops the conversation if the pivotal distance between two or more conversation patches are below a predetermined threshold. For example, if conversation improvement program 101 determines a pivotal distance between two or more patches are below 0.1, conversation improvement program 101 stops the conversation.

In an embodiment, a NLG engine associated with a digital agent generates the new sentences based on the conversation thread context and the prior sentence from the counter digital agent. While a response to the prior sentence is generated, the advancing conversation is added using the context and the state of the conversation. As mentioned before, it starts with the simple triad grammar and creates the longer sentences while keeping the context and other words used by the counter party. The NLG engine will use the triad, the context and the verbs from the states with the sentiment and additional words to create the sentence. In an embodiment, conversation improvement program 101 analyzes words in the conversation stage or thread to determine subject, object contexts, action, and end states. In an embodiment, conversation improvement program 101 determines parts of speech (POS) tagging and determines new sentences from the determined words and triads. In an embodiment, conversation improvement program 101 adjectives, adverbs, and others parts of speech are determined using Bag of Words in association with the determined triad.

In an embodiment, conversation improvement program 101 updates the Bag of Words for the business end agent and updates the end states and intermediate states. In an embodiment, the end state is the last state before conversation improvement program 101 ends the conversation. In an embodiment, the intermediate states are the one or more states prior to the end state. In an embodiment, conversation improvement program 101 repeats the previous process with the updated Bag of Words. In an embodiment, at the end of every conversation patch, conversation improvement program 101 obtains additions to BoW and BoP if there is anything new by validating if a word is a synonym or is a different part of speech and hence has a modified meaning, or is a Named-Entity Recognition (NER), etc. In an embodiment, a NER is a subtask of information extraction that seeks to locate and classify named entities mentioned in unstructured text into pre-defined categories such as person names, organizations, locations, medical codes, time expressions, quantities, monetary values, percentages, etc. It should be recognized any NER algorithm may be used to determine and classify named entities or meanings in one or more patches, sentences, or chats.

In an embodiment, conversation improvement program 101 determines a new state of the first stage of the conversation after updating the bag of words (BoW) or bag of phrases (BoP) with the new conversation patch. In an embodiment, conversation improvement program 101 recalculates the pivot distance between the new state of the first stage of the conversation and the subsequent, second stage of the conversation. In an embodiment, responsive to determining that the pivot distance between the new state of the first stage of the conversation and the subsequent, second stage of the conversation is above the predetermined threshold, conversation improvement program 101 allows the conversation to progress to the second, subsequent stage of the conversation.

In an embodiment, conversation improvement program 101 auto generates test cases to test drifting conversation, new pivots, etc. In an embodiment, different phrases in BoP/BoW are taken and with part of speech assignment and grammar rules defined, new sentences are generated by the NLG engine to simulate the end user's VA (virtual Agent). In an embodiment, sentences are pivoted on the context and simple or compound sentences are only created. If the sentence generation is a continuation, then the words from the other participant's sentences are taken and new words from the BoP/BoW are introduced, computing the pivot distance each time a grammatically correct sentence is created. The grammar correctness is checked by the lowest level decomposition of the triad {subject, verb, object} of a direct speech. The NLG engine also starts with the same triad with the object being the next state to move to and the action being the verb. Based on the words from the other participant's sentences, the sentence is extended while keeping the pivot distance within the range. If the other participant's sentences ended up with higher level of compounding, then it is reduced to the 2nd normal factor—same context, additional phrase as multiple attributes/features (as comma separated) for the common subject/object or verb. If it is a complex sentence, it is split into compound based on the contexts and common subject or object or verb and then further reduced to the second normal sentence type. Thus, the different sentences are taken till all the combinations based on the BoP/BoW are considered. Sentiment words—positive, neutral, negative are taken, and the conversations extended to create the test set.

Embodiments of the invention, determine a current state of a first stage of a conversation between a pair of virtual agents. Embodiments of the invention, determine a pivot distance between the current state of the first stage of the conversation and a subsequent, second stage of the conversation. Responsive to determining that the pivot distance between the current state of the first stage of the conversation and the subsequent, second stage of the conversation is below a predetermined threshold, embodiments of the invention determine an angle of dislocation with respect to the pivot distance. Embodiments of the invention, terminate the conversation based, at least in part, on determining that the angle of dislocation is above a predetermined threshold.

Figure 2:
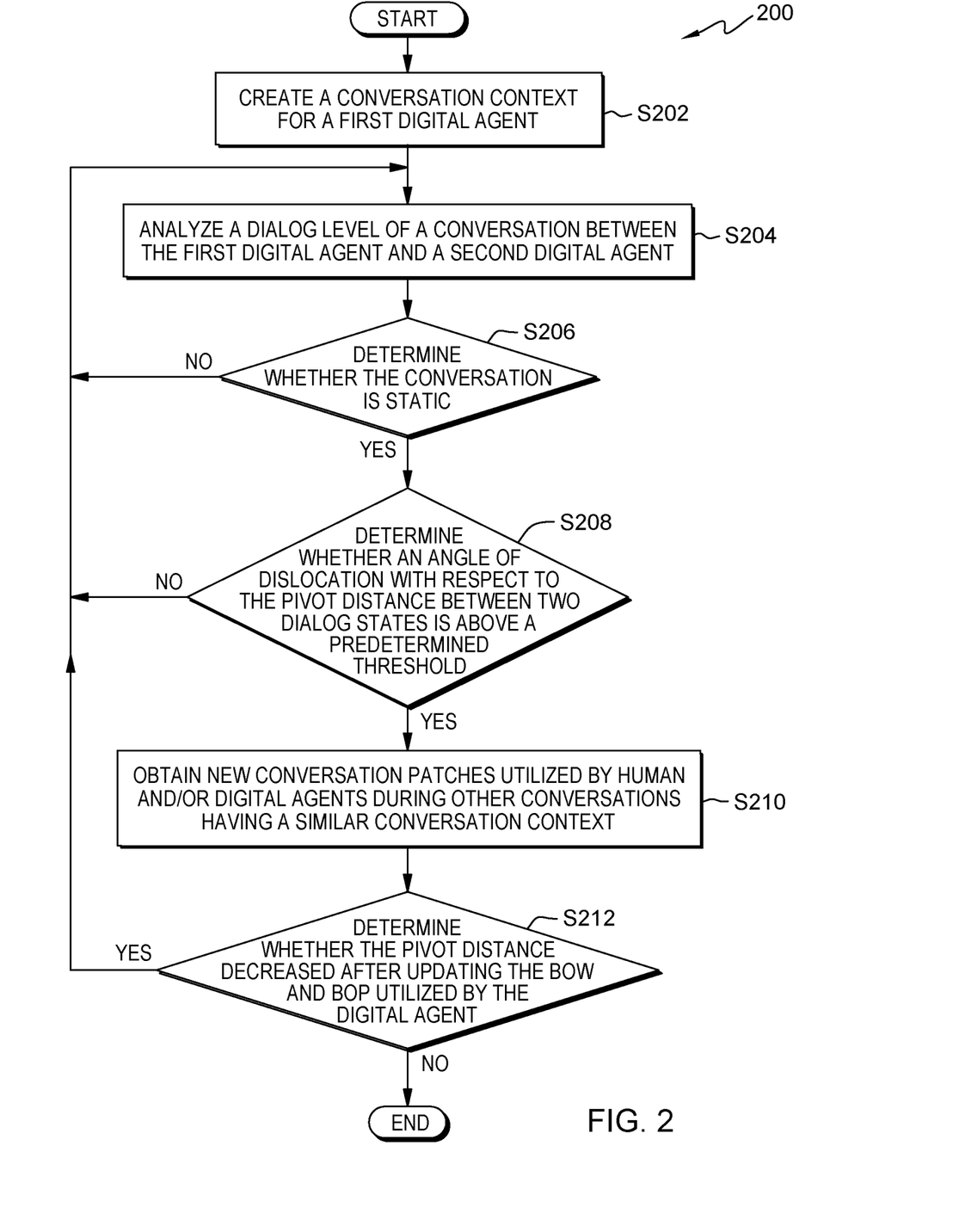
FIG. 2 is a flow chart diagram depicting operational steps for conversation improvement program 101, generally designated 200, in accordance with at least one embodiment of the present invention.

FIG. 2 is a flow chart diagram depicting operational steps for conversation improvement program 101, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, conversation improvement program 101 creates a conversation context for a first digital agent. In an embodiment, creating the conversation context includes establishing a set of conversation patches for the first digital agent. As defined herein, a conversation patch is a set of available statements for use by a digital agent for a particular conversation context. In an embodiment, the set of conversation patches includes end state and intermediate state definitions. In an embodiment, new conversation patches are provided to the digital agent based on identifying new states based on conversation turns or terminations.

At step S204, conversation improvement program 101 analyzes a dialog level of a conversation between the first digital agent and a second digital agent. In an embodiment, analyzing the dialog level of the conversation includes calculating a pivot distance at each dialog level and each state level of a conversation patch of the conversation.

At decision step S206, conversation improvement program 101 determines whether the conversation is static. In an embodiment, the conversation is determined to be static if the pivot radius of the pivot distance across two or more dialog levels of the conversation is below a predetermined threshold. In an embodiment, the conversation is further determined to be static if a state change in the conversation does not occur within a predetermined amount of time. In an embodiment, the conversation is determined not to be static if the pivot radius or pivot distance across two or more dialog levels of the conversation is above a predetermined threshold. In an embodiment, the conversation is further determined not to be static if a state change in the conversation occurs within a predetermined amount of time. If the conversation is determined to be static (decision step S206 "YES" branch), conversation improvement program 101 proceeds to step S208. If the conversation is determined not to be static (decision step S206 "NO" branch), conversation improvement program 101 returns to step S204 and continues to analyze the next dialog level of the conversation.

At decision step S208, responsive to the pivot distance being below the predetermined threshold, conversation improvement program 101 determines whether an angle of dislocation with respect to the pivot distance between two dialog states is above a predetermined threshold. In an embodiment, the angle of dislocation is calculated as follows: Angle of dislocation θ=a tan ((# of States/total States)/Pivot distance). If the angle of dislocation is below the predetermined threshold (e.g., <45 deg (tan theta<1)) (decision step S208 "NO" branch), the conversation proceeds to the next dialog level and conversation program 101 returns to step S204 to analyze the next dialog level of the conversation. If the angle of dislocation is above the predetermined threshold (e.g., >45 deg (tan theta>1)) (decision step S208 "YES" branch), conversation improvement program 101 proceeds to step S210.

At step S210, conversation improvement program 101 obtains new conversation patches utilized by human and/or digital agents during other conversations having a similar conversation context. In an embodiment, obtaining new conversation patches includes updating the BoW or BoP utilized by the digital agent with the words and phrases included in the newly obtained conversation patches.

At decision step 212, conversation improvement program 101 determines whether the pivot distance decreased after updating the BoW and BoP utilized by the digital agent. If conversation improvement program 101 determines that the pivot distance decreased after updating the BoW and BoP, conversation improvement program 101 permits the conversation to continue and returns to step S204. If conversation improvement program 101 determines that the pivot remains constant or increased after updating the BoW and BoP, conversation improvement program 101 terminates the conversation and the process ends.

Figure 3:
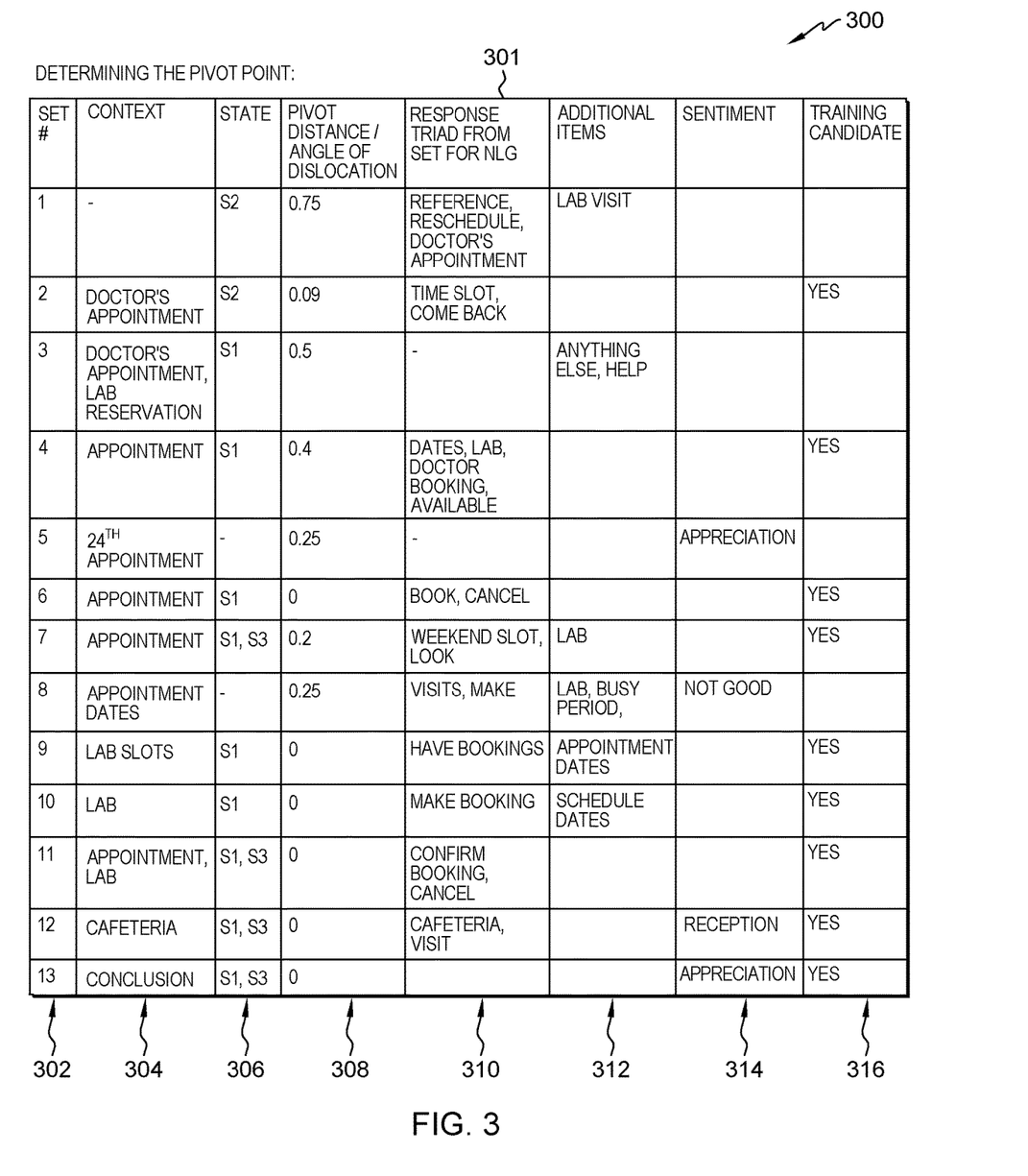
FIG. 3 is a table diagram depicting determining the pivot point for one or more sets, generally designated 300, in accordance with at least one embodiment of the present invention.

FIG. 3 is a table diagram depicting determining the pivot point for one or more sets, generally designated 300, in accordance with at least one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

In an example, a business has the following chat snippets from their help desk digital agent conversation. Conversation improvement program 101 performs NLP analysis of the contexts and end points show that most calls are around product information, product usage, and product malfunctions. When a new call comes and is identified as with a consumer's personal conversation agent, the chat state is determined, the context and issue determined and then the dialogs are held. In an embodiment, a dialog is a set, phrase, or one or more sentences. At each dialog, the pivot radius and angle of conversation to the next state is determined. If there are conversation turns, the context and issue matching is done. If not, the conversation is initiated to be terminated. If there is a dialog dislocation, the termination is carried out or the conversation terminated between the two conversational agents into the abnormal end state. In an embodiment, the conversation is sent to a human conversationalist to finish the conversation.

In this example, the client's digital assistant (Client DA) has been asked to reschedule an appointment with the spa with a hair salon visit to the attached nail salon for Client.

The client's digital assistant logs into the practice platform and starts the chat with the salon's digital assistant (Salon DA).

Salon DA: Hi, thank you for connecting with us. I am the Salon, how may I help you?
Client DA: Hi Salon, this is with reference to rescheduling the hair salon appointment for Client on April 20th at 6:00 PM. Client is busy but is available on April 22nd or 24th at 6:00 PM and on April 24th at 4:00 PM also. [Set 1]
Salon DA: Hi Client, thank you for the information. I am happy to accommodate the hair salon appointment for April 24th at 4 PM. The associated nail salon appointment cannot be rescheduled along with as the nail salon is booked full on April 24th in the afternoon.
Client DA: I do not have another time slot in the next 2 weeks. Can I check and come back? [Set 2]
Salon DA: Sure Client. Please be aware that I cannot keep the April 24th 4 PM appointment open as it is on a first come first book basis.
Client DA: Ok, I understand. [Set 3]
Salon DA: Is there anything else I can help with Client?
Client DA: At the moment no, but when are the next dates when both the hair salon and the nail salon bookings are available? [Set 4]
Salon DA: The next set of dates are May 2nd at 4 PM and 6 PM and 3rd May at 6 PM.
Client DA: thank you, bye. [Set 5]
Client DA: Can you block 24th April appointment slot while I check and come back? [Set 6]
Salon DA: No sir, we can keep only one appointment. I will be happy to cancel the one of the 20th and book for 24th.
Client DA: Ok, please book 24th and cancel 20th.
Salon DA: Should we also look for a nail salon date? The available slots are 25th 4 PM and 6 PM and 26th 6 PM.
Client DA: Both are not good, is there a weekend slot? [Set 7]
Salon DA: The nail salons do not work on weekend, sorry Sir.
Client DA: Client will need to make multiple visits now and that is not good. [Set 8]
Salon DA: Sorry, sir, this is a busy period. Client can take the nail salon booking on 2nd May 4 PM or 6 PM.
Client DA: Can he have both the bookings for 2nd May 6 PM? [Set 9]
Salon DA: Yes sir. They are available.
Client DA: Please make the bookings for 2nd May 6 PM. [Set 10]
Salon DA: Shall I cancel the April 24th appointment?
Client DA: Please confirm the 2nd May 6 PM first and then please cancel [Set 11]
Salon DA: It is confirmed for 2nd May and the 24th April is cancelled. Is there anything else we can help with?
Client DA: Can I visit the cafeteria at the clinic? [Set 12]
Salon DA: Please check with the reception when you arrive.
Client DA: Thank you and bye. [Set 13]

As depicted in table 301 in FIG. 3, column 302 represents the sets, column 304 represents the context, column 306 represents the state, column 308 represents the pivot distance/angel of dislocation, column 310 represents the response triad from set for NLG, column 312 represents the additional items, column 314 represents the sentiment, and column 316 represents the training candidate.

Conversation improvement program 101 determines the context from each set. Conversation improvement program 101 determines the state of each set based on the context. Conversation improvement program 101 determines the states as:

States: {S1—appointment booked, S2—appointment cancelled, S3—appointment query, S4—appointment request}

Conversation improvement program 101 determines the pivot distance and angle of dislocation for each set based on:

$$\text{Pivot distance: } D = /\{\text{word:} = \text{BoP/BoW}, 1, 0\}/n + \Sigma\{\text{word: synonymn:} = \text{BoP/BoW}, x, y\}$$

$$\text{Angle of dislocation } \theta = a\tan((\text{\# of States/total States})/\text{Pivot distance})$$

$$\text{Pivot distance} < 0.5 \text{ or angle of dislocation} > 45 \text{ deg} \\ (\tan\theta > 1)$$

In an embodiment, conversation improvement program 101 determines what state each patch or set relates to. In this example, conversation improvement program 101 determines set 1 is state S2, and set 3 is state S1. In an embodiment, conversation improvement program 101 continues the conversation because the calculated pivot distance between each set is above a predetermined calculated threshold. As shown sets #1-8 the pivotal distance ranges from 0 to 0.75, and conversation improvement program 101 continues the conversation. However, when sets 9-13 receive a 0 pivotal distance, conversation improvement program 101 moves the conversation between two digital agents to a conclusion state and to the conversation end state. Here, the conversation ended because pivot distance became constant or static.

FIG. 4 is a block diagram depicting components of a computing device, generally designated 400, suitable for conversation improvement program 101 in accordance with at least one embodiment of the invention. Computing device 400 includes one or more processor(s) 404 (including one or more computer processors), communications fabric 402, memory 406 including, RAM 416 and cache 418, persistent storage 408, which further includes conversation improvement program 101, communications unit 412, I/O interface(s) 414, display 422, and external device(s) 420. It should be appreciated that FIG. 4 provides only an illustration of one embodiment and does not imply any limitations with regard to the environments in which different embodiments may be implemented. Many modifications to the depicted environment may be made.

As depicted, computing device 400 operates over communications fabric 402, which provides communications between computer processor(s) 404, memory 406, persistent storage 408, communications unit 412, and input/output (I/O) interface(s) 414. Communications fabric 402 can be implemented with any architecture suitable for passing data or control information between processor(s) 404 (e.g., microprocessors, communications processors, and network processors), memory 406, external device(s) 420, and any other hardware components within a system. For example, communications fabric 402 can be implemented with one or more buses.

Memory 406 and persistent storage 408 are computer readable storage media. In the depicted embodiment, memory 406 includes random-access memory (RAM) 416 and cache 418. In general, memory 406 can include any suitable volatile or non-volatile computer readable storage media.

Program instructions for conversation improvement program 101 can be stored in persistent storage 408, or more generally, any computer readable storage media, for execution by one or more of the respective computer processor(s)

404 via one or more memories of memory 406. Persistent storage 408 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 can include one or more network interface cards. Communications unit 412 may provide communications through the use of either or both physical and wireless communications links. In the context of some embodiments of the present invention, the source of the various input data may be physically remote to computing device 400 such that the input data may be received, and the output similarly transmitted via communications unit 412.

I/O interface(s) 414 allows for input and output of data with other devices that may operate in conjunction with computing device 400. For example, I/O interface(s) 414 may provide a connection to external device(s) 420, which may be as a keyboard, keypad, a touch screen, or other suitable input devices. External device(s) 420 can also include portable computer readable storage media, for example thumb drives, portable optical or magnetic disks, and memory cards. Software and data used to practice embodiments of the present invention can be stored on such portable computer readable storage media and may be loaded onto persistent storage 408 via I/O interface(s) 414. I/O interface(s) 414 also can similarly connect to display 422. Display 422 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
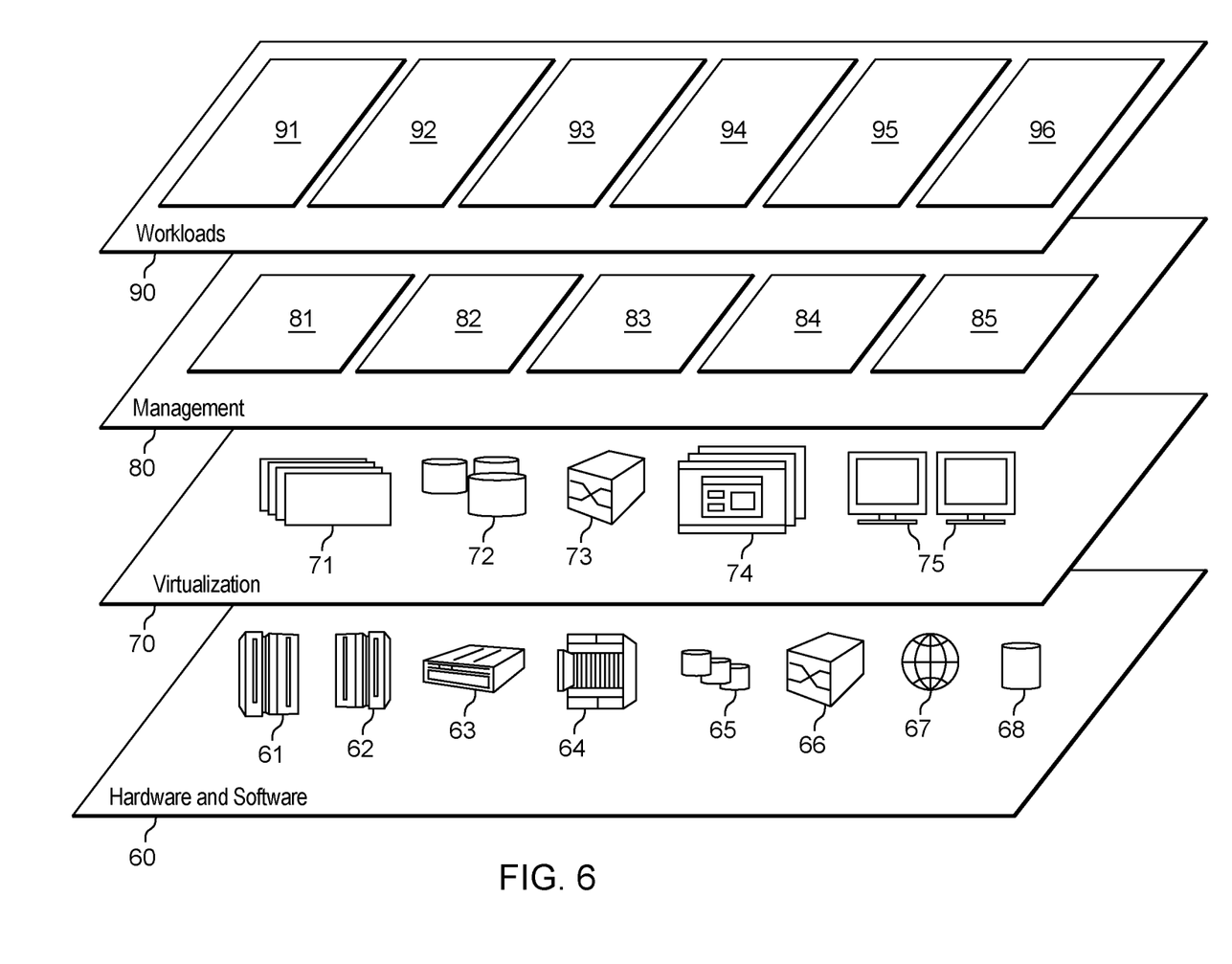
FIG. 6 is block diagram depicting a set of functional abstraction model layers provided by cloud computing environment 50 depicted in FIG. 5 in accordance with at least one embodiment of the present invention.

FIG. 6 is block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital assistant training 96.

What is claimed is:

1. A computer-implemented method for virtual agent conversation training, the computer-implemented method comprising:
   determining a current state of a first stage of a conversation between a pair of virtual agents;
   determining a pivot distance between the current state of the first stage of the conversation and a subsequent, second stage of the conversation;
   responsive to determining that the pivot distance between the current state of the first stage of the conversation and the subsequent, second stage of the conversation is below a predetermined threshold, determining an angle of dislocation with respect to the pivot distance; and
   terminating the conversation based, at least in part, on determining that the angle of dislocation is above a predetermined threshold.

2. The computer-implemented method of claim 1, further comprising, responsive to determining that the angle of dislocation is above a predetermined threshold:
   obtaining a new conversation patch utilized by a previous conversations having a similar conversational context; and
   updating a bag of words (BoW) or bag of phrases (BoP) utilized by a digital agent with words or phrases included in the new conversation patch.

3. The computer-implemented method of claim 2, further comprising:
   determining a new state of the first stage of the conversation after updating the bag of words (BoW) or bag of phrases (BoP) with the new conversation patch;
   recalculating the pivot distance between the new state of the first stage of the conversation and the subsequent, second stage of the conversation; and
   responsive to determining that the pivot distance between the new state of the first stage of the conversation and the subsequent, second stage of the conversation is above the predetermined threshold, allowing the conversation to progress to the second, subsequent stage of the conversation.

4. The computer-implemented method of claim 2, further comprising:
   determining a new state of the first stage of the conversation after updating the bag of words (BoW) or bag of phrases (BoP) with the new conversation patch;
   recalculating the pivot distance between the new state of the first stage of the conversation and the subsequent, second stage of the conversation; and
   responsive to determining that the pivot distance between the new state of the first stage of the conversation and the subsequent, second stage of the conversation is below the predetermined threshold, terminating the conversation.

5. The computer-implemented method of claim 1, wherein terminating the conversation further comprises:
   requesting human intervention to complete the conversation.

6. The computer-implemented method of claim 1, further comprising:
   determining the conversation is successful, based, at least in part on, ending the conversation with a particular allocated conversation patch for a particular conversational context.

7. The computer-implemented method of claim 1, wherein terminating the conversation is further based, at least in part on, determining a pivot radius calculated across one or more dialogs between the pair of virtual agents remains within a predetermined range.

8. The computer-implemented method of claim 1, further comprising:
   determining the pivot distance between the current state of the first stage of the conversation and the subsequent, second stage of the conversation is above a predetermined threshold; and
   allowing the conversation to continue.

9. A computer program product for virtual agent conversation training, the computer program product comprising one or more computer readable storage media and program instructions stored on the one or more computer readable storage media, the program instructions including instructions to:
   determine a current state of a first stage of a conversation between a pair of virtual agents;
   determine a pivot distance between the current state of the first stage of the conversation and a subsequent, second stage of the conversation;
   responsive to determining that the pivot distance between the current state of the first stage of the conversation and the subsequent, second stage of the conversation is below a predetermined threshold, determine an angle of dislocation with respect to the pivot distance; and
   terminate the conversation based, at least in part, on determining that the angle of dislocation is above a predetermined threshold.

10. The computer program product of claim 9, further comprising instructions to, responsive to determining that the angle of dislocation is above a predetermined threshold:
    obtain a new conversation patch utilized by a previous conversations having a similar conversational context; and
    update a bag of words (BoW) or bag of phrases (BoP) utilized by a digital agent with words or phrases included in the new conversation patch.

11. The computer program product of claim 10, further comprising instructions to:
    determine a new state of the first stage of the conversation after updating the bag of words (BoW) or bag of phrases (BoP) with the new conversation patch;
    recalculate the pivot distance between the new state of the first stage of the conversation and the subsequent, second stage of the conversation; and
    responsive to determining that the pivot distance between the new state of the first stage of the conversation and the subsequent, second stage of the conversation is above the predetermined threshold, allow the conversation to progress to the second, subsequent stage of the conversation.

12. The computer program product of claim 10, further comprising instructions to:
    determine a new state of the first stage of the conversation after updating the bag of words (BoW) or bag of phrases (BoP) with the new conversation patch;
    recalculate the pivot distance between the new state of the first stage of the conversation and the subsequent, second stage of the conversation; and
    responsive to determining that the pivot distance between the new state of the first stage of the conversation and the subsequent, second stage of the conversation is below the predetermined threshold, terminate the conversation.

13. The computer program product of claim 9, further comprising instructions to:
    determine the conversation is successful, based, at least in part on, ending the conversation with a particular allocated conversation patch for a particular conversational context.

14. The computer program product of claim 9, further comprising instructions to:
    determine the conversation is successful, based, at least in part on, ending the conversation with a particular allocated conversation patch for a particular conversational context.

15. The computer program product of claim 9, further comprising instructions to:
    determine the pivot distance between the current state of the first stage of the conversation and the subsequent, second stage of the conversation is above a predetermined threshold; and
    allow the conversation to continue.

16. A computer system for virtual agent conversation training, comprising:
    one or more computer processors;
    one or more computer readable storage media;
    computer program instructions;
    the computer program instructions being stored on the one or more computer readable storage media for execution by the one or more computer processors; and
    the computer program instructions including instructions to:
        determine a current state of a first stage of a conversation between a pair of virtual agents;
        determine a pivot distance between the current state of the first stage of the conversation and a subsequent, second stage of the conversation;
        responsive to determining that the pivot distance between the current state of the first stage of the conversation and the subsequent, second stage of the conversation is below a predetermined threshold, determine an angle of dislocation with respect to the pivot distance; and
        terminate the conversation based, at least in part, on determining that the angle of dislocation is above a predetermined threshold.

17. The computer system of claim 16, further comprising instructions to, responsive to determining that the angle of dislocation is above a predetermined threshold:
    obtain a new conversation patch utilized by a previous conversations having a similar conversational context; and
    update a bag of words (BoW) or bag of phrases (BoP) utilized by a digital agent with words or phrases included in the new conversation patch.

18. The computer system of claim 17, further comprising instructions to:
    determine a new state of the first stage of the conversation after updating the bag of words (BoW) or bag of phrases (BoP) with the new conversation patch;

recalculate the pivot distance between the new state of the first stage of the conversation and the subsequent, second stage of the conversation; and responsive to determining that the pivot distance between the new state of the first stage of the conversation and the subsequent, second stage of the conversation is above the predetermined threshold, allow the conversation to progress to the second, subsequent stage of the conversation.

19. The computer system of claim 17, further comprising instructions to:

determine a new state of the first stage of the conversation after updating the bag of words (BoW) or bag of phrases (BoP) with the new conversation patch;

recalculate the pivot distance between the new state of the first stage of the conversation and the subsequent, second stage of the conversation; and responsive to determining that the pivot distance between the new state of the first stage of the conversation and the subsequent, second stage of the conversation is below the predetermined threshold, terminate the conversation.

20. The computer system of claim 16, further comprising instructions to:

determine the conversation is successful, based, at least in part on, ending the conversation with a particular allocated conversation patch for a particular conversational context.

* * * * *